Patented July 18, 1933

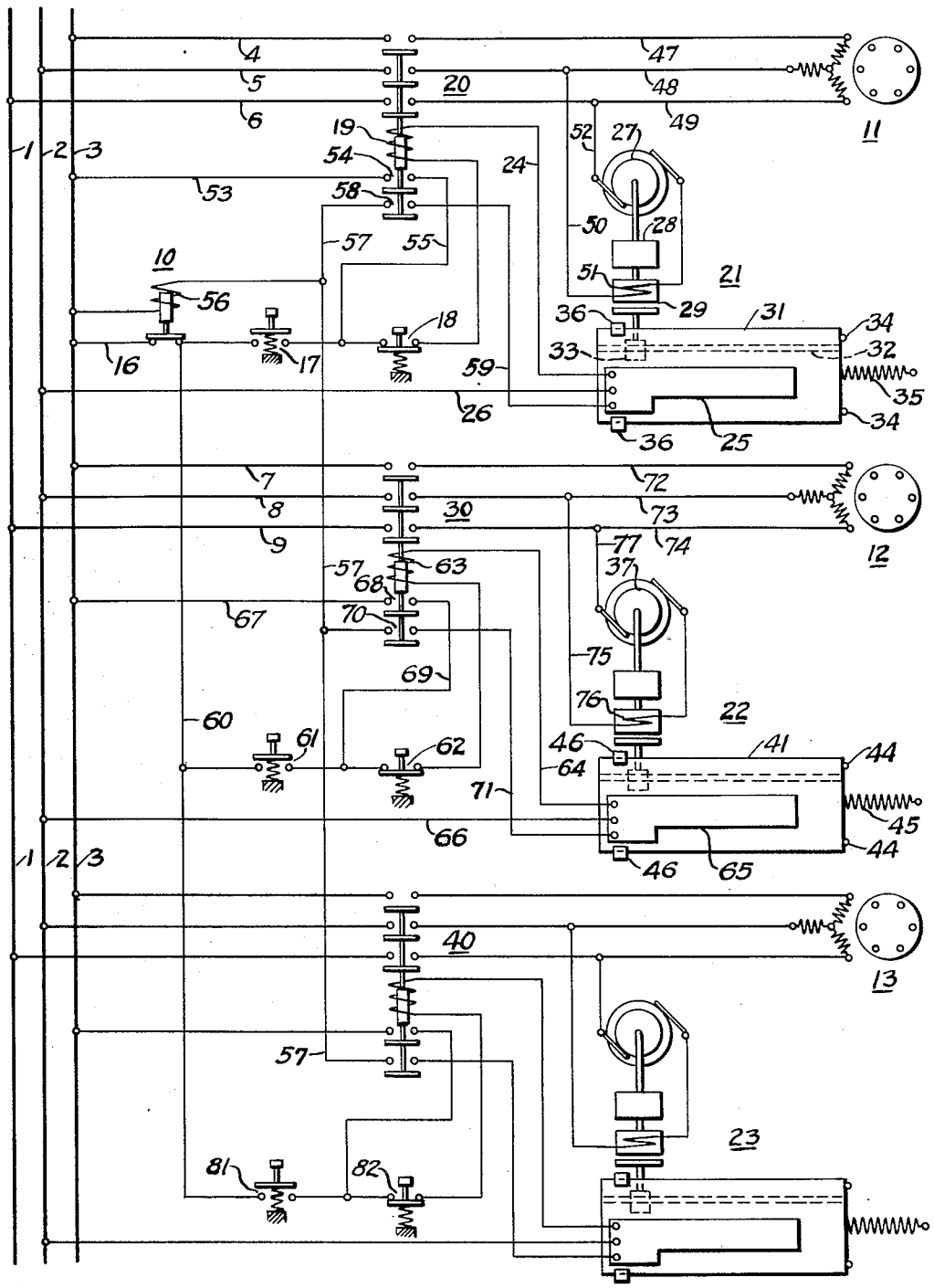

1,918,960

UNITED STATES PATENT OFFICE

ROBERT S. ELBERTY, JR., OF WILKINSBURG, PENNSYLVANIA, ASSIGNOR TO WESTINGHOUSE ELECTRIC & MANUFACTURING COMPANY, A CORPORATION OF PENNSYLVANIA

TIMING DEVICE FOR LAUNDRY EXTRACTORS

Application filed February 28, 1931. Serial No. 519,098.

My invention relates to electrical control systems for controlling the operation of a plurality of motors to be supplied from a common source of electrical energy.

Some machines, such as extractors, washers, rubber mills, rolling mills, etc., are known to require a high starting torque, either because of the moment of inertia of the machine or because of the static friction resulting from the material in the machine or both. Where a number of such machines are installed and are driven by independent motors supplied with electrical energy from a common source, the generating equipment supplying such motors may be dangerously overloaded if all the motors are started at the same time. Electrical control systems are known in the art that prevent the starting and stopping of two or more machines at the same time, but such control systems always involve an expensive and complicated electrical control system.

One object of my invention is to provide for the proper sequence of starting and stopping a plurality of motors supplied with electric energy from a common source.

Another and more specific object of my invention is to provide a simplified electrical control system for a plurality of motors, requiring but a single master relay for controlling the starting and stopping sequence of the motors.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which the single figure illustrates diagrammatically an electrical control scheme, in combination with a plurality of motors to be controlled.

Referring to the drawing, 11, 12 and 13 represent the motors the starting and stopping sequences of which are to be controlled. Associated with the respective motors are a plurality of timing devices 21, 22 and 23. I do not wish to be limited to the particular timing devices here illustrated because it is obvious that any timing device, such as a clock, may be used to control the periods of operation of the respective motors.

In this particular embodiment, the timing devices comprise synchronous motors. The field windings of the motors and the source of direct current for exciting the field windings are not shown but, obviously, such equipment may be of a well known character. For instance, the field windings may be excited from a battery, a motor generator set or the source of alternating-current supply shown, through a system of rectifiers. The timing-motor load, being merely a small controller, is usually small, thus requiring only a small motor. In some instances, a permanent magnet may, in such case, be used as a field for the timing motor.

The motors 11, 12 and 13 are supplied with alternating-current electrical energy from the supply conductors 1, 2 and 3 connected to a suitable alternator (not shown). The line contactors 20, 30 and 40, when energized, connect the respective motors to the supply conductors, and these line contactors are, in turn, controlled in operation by a master relay 10, the respective push-button switches 17, 18, 61, 62, 81 and 82 and the respective timers 21, 22 and 23.

A clearer understanding of the construction and novel function of my invention may be had from a study of the details of operation thereof.

Assuming that the supply conductors are energized, the timing-motor field windings excited and the machines to be driven by the motors properly charged, to start the operation of the equipment, the attendant depresses starting push-button switch 17, thereby establishing a circuit from the supply conductor 3, through conductor 16, the contact members of the master relay 10, the push-button switch 17, the stop push-button switch 18, the actuating coil 19 of the line contactor 20, conductor 24, controller segment 25 of the controller driven by the timing device 21 and conductor 26, to the supply conductor 2. Operation of the line contactor 20 establishes a holding circuit for the actuating coil 19. This holding circuit may be traced from the supply conductor 3, conductor 53, through the contact members 54 of the main-line contactor 20 and conductor 55, to the stop push-button switch 18. As soon as the holding circuit is completed, the switch 17 may be released.

The instant the line contactor operates, an energizing circuit is established for the master relay 10, such circuit extending from the supply conductor 3, through the actuating coil 56 of the master relay 10, conductor 57, the contact members 58 of the line contactor 20, conductor 59, controller segment 25 and conductor 26, to the supply conductor 2. It should be noted that all the starting push-button switches 17, 61 and 81 are connected to the negative side of the contact members of the master relay 10. If the master relay is energized, as just explained, and the contacts of this relay have opened, operation of any of the starting switches cannot start the operation of any other motor until after the expiration of a definite time, as will be explained presently.

With the operation of the line contactor 20, the motor 11 is connected to the source of electric energy, through conductors 4, 5 and 6, the main contact members on the line contactor 20 and conductors 47, 48 and 49, to the primary of the induction motor 11. At the instant motor 11 begins to accelerate, the master relay 10 operates to prevent the starting of motors 12 and 13. With the operation of the line contactor 20, an operating circuit is also established for the timing device 21. This circuit may be traced from conductor 48, through conductor 50, the actuating coil 51 of the spring-controlled and magnetically-actuated clutch 29, the armature 27 of the timing motor and conductor 52, to the conductor 49. The timing motor drives a reciprocally movable controller carriage 31 through the reduction gear 28, the magnetically actuated clutch 29, pinion 33 and rack 32 secured to the under or back side of the carriage 31. The carriage 31 is spring biased toward the right by the spring 35 and is limited in its movement toward the right by the pins 34. A pair of guides 36 retain the pinion 33 and rack 32 in engagement and govern the reciprocatory movement of the carriage. When the clutch-actuating coil 51 is energized, the pinion 33 is operatively connected to the reduction gear 28. It is thus obvious that, when the timing motor is energized, the pinion 33 is operatively connected to the motor shaft to drive the carriage 31 toward the left. Since the timing motor is a synchronous motor, the carriage carrying the controller segment 25 will move toward the left at a given rate. When, for some reason, the coil 51 becomes deenergized, the clutch 29 releases the pinion 33, and the spring 35 retracts the carriage 31 to the position shown.

With the operation of the motor 11, the carriage 31 starts moving toward the left and, after a predetermined interval of time, the controller segment 25 becomes disengaged from the contact finger on the conductor 59. The controller segment 25 is so constructed that the motor 11, when driving a loaded machine, will have accelerated to a predetermined speed before the contact finger on conductor 59 becomes disengaged. When the contact finger on conductor 59 becomes disengaged from the controller segment 25, the energizing circuit for the actuating coil 56 of the master relay 10 is interrupted, and, in consequence, the conductor 60 is again energized from the supply conductor 3 through conductor 16 and the contact members of the master relay 10.

When the conductor 60 becomes energized, as just explained, the motor 12 may be started by manually operating the starting push-button switch 61. When the starting switch 61 is actuated, a circuit is established, through elements 62, 63, 64, 65 and 66, to the supply conductor 2. A holding circuit is immediately established for actuating coil 63, through elements 67, 68 and 69, to stop switch 62. The instant the line contactor 30 operates, the circuit for the master relay is established. This circuit may be traced from supply conductor 3, through the actuating coil 56, conductor 57, contact members 70 of the line contactor 30, conductor 71, controller segment 65 and conductor 66, to the supply conductor 2.

From the foregoing discussion, it will be apparent that conductor 60 becomes deenergized an instant after the line contactor 30 has operated, with the result that motor 13 cannot be started to operate until motor 12 has been accelerated, as above explained for motor 11.

The timing device 22 is similar, in every respect, to the timing device 21 previously discussed. When the line contactor closes its main contacts, the motor rotor 37 and the rotor of the motor 12 begin to rotate. After motor 12 has accelerated, the carriage 41, carrying the controller segment 65, moves to the position to disengage the contact finger on conductor 71, thereby interrupting the circuit for the master relay 10, which, thereupon, again causes conductor 60 to be energized. The motor 13 may now be started by operation of the starting push-button switch 81.

After motor 13 is started, all three machines driven by the motors 11, 12 and 13 are in full operation. Furthermore, the timing devices continue to operate during the operation of the driving motors. At some definite interval of time after the starting operation, depending on the structure and adjustment of the controller segment 25 on the carriage 31, the controller segment 25 becomes disengaged from both the contact fingers on the conductors 24 and 26, and both the motor 11 and the timing device 21 stop. After the lapse of another definite interval of time, the timing device 22 and motor 12 stop and, after the lapse of a third definite interval of time, the motor 13 and the timing device 23 stop. In some instances, it may be desirable to so design the controller carriage and the segments thereon that only a single timing device is necessary to control the starting and stopping sequence of the respective motors.

Assuming that the controller segment 65 has moved toward the left a sufficient distance, the contact fingers on conductors 64 and 66 are disengaged, the energizing circuit for the actuating coil 68 of the line contactor 30 is immediately interrupted, and the conductors 72, 73 and 74 are immediately disconnected from the energized conductors 7, 8 and 9. Also, the circuit through the elements 75, 76, 37 and 77 is interrupted. The spring 45 thereupon retracts the carriage 41 toward the right against the stop pins 44. The elements 46 serve as guides for the carriage 41. It is to be understood that the function and structure of all the timing devices are alike, but that the interval of time each motor is to operate is not necessarily the same. Obviously, the controller segments on each carriage may be different in length, from the controller segments on every other carriage.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. An electrical control system for controlling the starting and stopping of a plurality of motors, a plurality of motors, a common source of electrical energy for the motors, a plurality of manually controlled switches for connecting each motor to the source of electric energy, time-responsive means energized to operate by the operation of any one of said switches, a master relay energized by the operation of any one of said switches to prevent the operation of any other of said switches, said master relay being deenergized, after a predetermined interval of time, by said time-responsive means, thereby permitting the operation of another one of said switches, and means responsive to time for stopping each motor at a predetermined interval of time after it has started.

2. An electrical control system for controlling the starting and stopping of a plurality of motors being supplied with electrical energy from a common source, a plurality of motors, a line contactor for each motor, a manually operable switch for each contactor for controlling the operation of the contactor, a master relay responsive to the operation of any one of said contactors to prevent operation of any other contactor, a timing device associated with each motor for limiting the time of operation of the master relay to a definite period after the expiration of which a second contactor may be caused to operate by the manually operable switch associated therewith and the control cycle of the master relay be repeated, and means responsive to the timing device for stopping said motors at different times.

3. An electrical control system for controlling the starting and stopping of a plurality of motors being supplied with electrical energy from a common source, a plurality of motors, manually operable means for initiating the starting of one motor, electric means energized by the operation of the manually operable means for preventing the starting of any one of the other motors, time controlled means for deenergizing the said electric means, thereby permitting the starting of a second motor, and means responsive to time for stopping the operation of each motor after selected predetermined intervals of time.

4. An electrical control system for controlling the starting and stopping of a plurality of motors, a plurality of motors, a common source of electrical energy for the motors, a timing device, a plurality of starting means for the respective motors, a master relay energized by the operation of any one of the starting means to prevent operation of any other starting means, said timing device being disposed to deenergize the master relay to permit the operation of other starting means.

5. An electrical control system for controlling the starting of a plurality of motors, a plurality of motors, a common source of electrical energy for the motors, a timing device associated with each motor and operable therewith, starting means for each motor, and a single master relay disposed to be energized by the operation of any one of said starting means, means, controlled by said relay, adapted to prevent energization of any other starting means, and means associated with each timing device and disposed to be deenergized by the operation of any one of the timing devices thereby permitting the starting of any other motor.

ROBERT S. ELBERTY, Jr.